United States Patent [19]

Takahashi et al.

[11] Patent Number: 4,818,939
[45] Date of Patent: Apr. 4, 1989

[54] APPARATUS FOR MAGNETICALLY DETECTING POSITION OR SPEED OF MOVING BODY UTILIZING BRIDGE CIRCUIT WITH SERIES CONNECTED MR ELEMENTS

[75] Inventors: Tadashi Takahashi, Hitachi; Seizi Yamashita, Katsuta; Kunio Miyashita; Syooichi Kawamata, both of Hitachi, all of Japan

[73] Assignee: Hitachi, Ltd., Tokyo, Japan

[21] Appl. No.: 19,545

[22] Filed: Feb. 26, 1987

[30] Foreign Application Priority Data

Mar. 5, 1986 [JP] Japan .................................. 61-46185

[51] Int. Cl.$^4$ ............................ G01B 7/14; G01P 3/42
[52] U.S. Cl. ..................................... 324/208; 324/173; 324/252; 338/32 R
[58] Field of Search ................ 324/207, 208, 251, 252, 324/249, 173, 174, 178, 179, 260, 262; 338/32 R, 32 H

[56] References Cited

U.S. PATENT DOCUMENTS

| | | | |
|---|---|---|---|
| 4,319,188 | 3/1982 | Ito et al. | 324/173 |
| 4,594,548 | 6/1986 | Takahashi et al. | 324/208 |
| 4,663,588 | 5/1987 | Himuro et al. | 324/207 |

Primary Examiner—Reinhard J. Eisenzopf
Assistant Examiner—Warren S. Edmonds
Attorney, Agent, or Firm—Antonelli, Terry & Wands

[57] ABSTRACT

Magnetic poles are provided continuously with a pitch $\lambda$ on the peripheral portion of a drum rotated in accordance with a movement of a moving body. A magnetic sensor is provided in opposition to these poles. The sensor is formed of two magnetoresistive element pairs which are spaced from each other at $\lambda/6$, and the two elements in each pair are arranged in positions spaced from each other at $\lambda/2$. The two elements in each pair are connected in series to form a bridge circuit. The signals obtained from the nodes of the series-connected elements in the two element pairs are differentially amplified so that third harmonic wave components are eliminated, and a signal having no distortion and representative of the position or speed of the moving body can be obtained.

13 Claims, 8 Drawing Sheets

FIG. 5a $R_{11}$
FIG. 5b $R_{21}$
FIG. 5c $R_{12}$
FIG. 5d $R_{22}$
FIG. 5e $V_{01}$
FIG. 5f $V_{02}$
FIG. 5g $V_0$
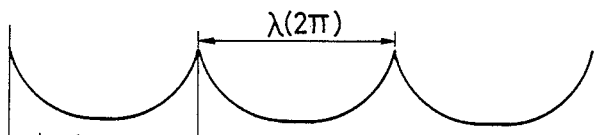
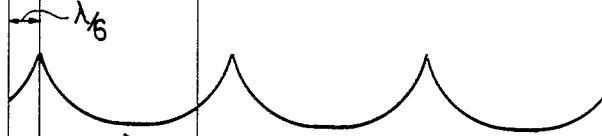
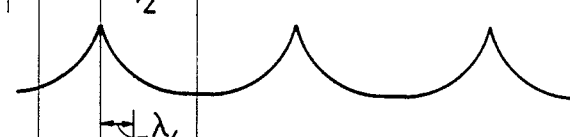
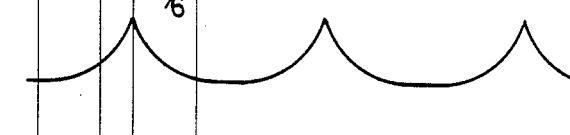
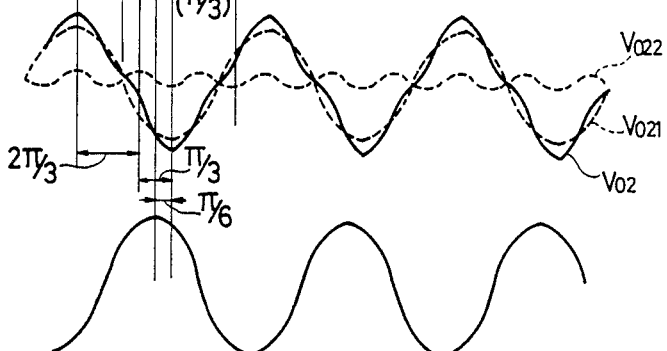

FIG. 8
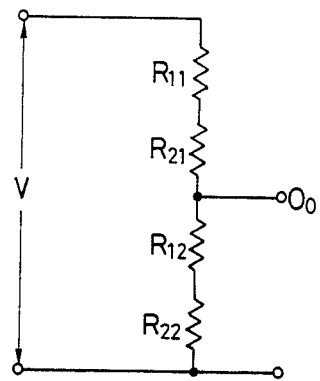
FIG. 9a  $R_{11}+R_{21}$
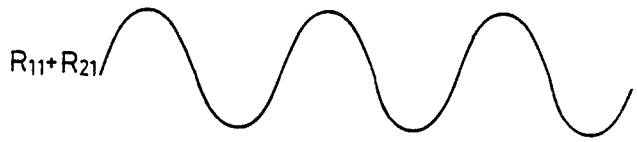
FIG. 9b  $R_{12}+R_{22}$
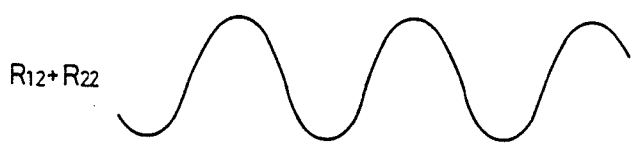
FIG. 9c  $V_0$
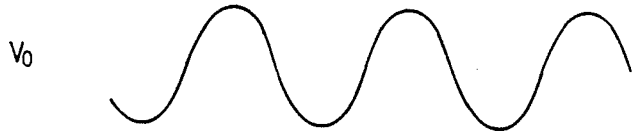

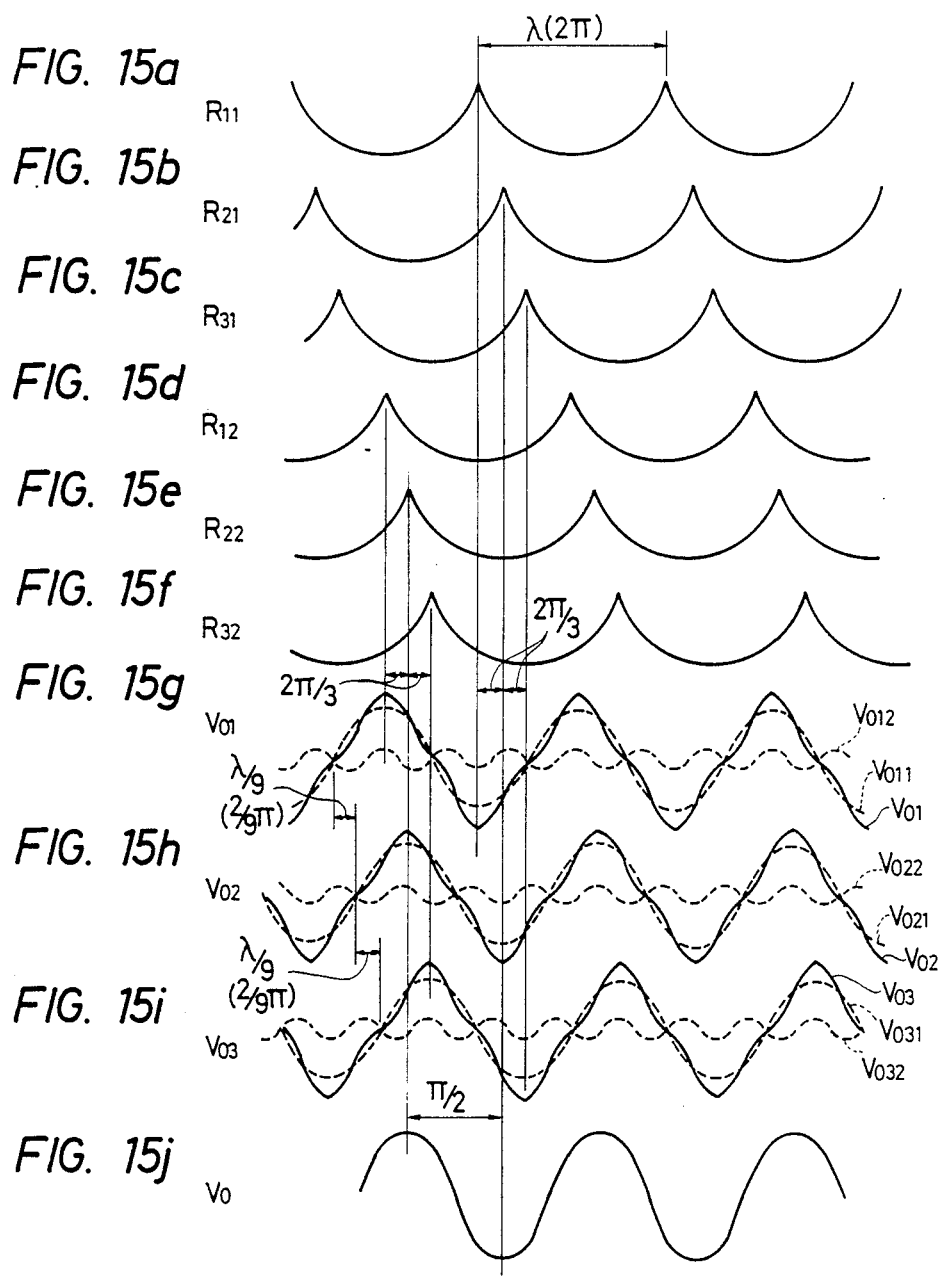

APPARATUS FOR MAGNETICALLY DETECTING POSITION OR SPEED OF MOVING BODY UTILIZING BRIDGE CIRCUIT WITH SERIES CONNECTED MR ELEMENTS

BACKGROUND OF THE INVENTION

1. Field of the Invention:

This invention relates to an apparatus for magnetically detecting the position or speed of a moving body by using a magnetoresistive element, and more particularly to an apparatus for obtaining a sine wave output signal for detecting the position or speed of a moving body.

This invention can be applied to a rotationally moving body, a linearly moving body and a sinuously moving body.

Namely, this invention is directed to an apparatus for detecting the angle of rotation of various types of rotary shafts, to say nothing of the angle of rotation and speed of, for example, a motor. The apparatuses, to which the present invention can be applied to detect the position or speed of a linearly moving body, include a position detector in a printing head of a printer and a head of a magnetic disc drive. Generally speaking, the present invention can be utilized widely for a speed controlling apparatus or various types of positioning apparatus.

2. Description of the Related Art:

An apparatus for detecting the position and angle of a moving body by using a magnetoresistive element (which will hereinafter be referred to as a MR element) which is adapted to sense magnetism and cause variation in the internal electric resistance thereof is well known. The invention disclosed in U.S. Pat. No. 4,319,188 is also an example of an apparatus for detecting the angle of a moving body by using a MR element. The internal electric resistance of a MR element varies depending upon the intensity of a magnetic field working thereon. Therefore, when the air gap between a MR element and a magnetic medium having a plurality of magnetic poles and moving as it is opposed to the MR element varies, an output signal of the MR element also varies based on the variation of the internal electric resistance. For example, the true circularity of a rotary magnetic medium cannot be obtained even if the magnetic medium is manufactured with the highest possible accuracy. The magnetic medium also has unbalanced mass and causes the rotary system to have play and eccentricity. Consequently, when the magnetic medium is rotated, the air gap varies in each turn thereof to cause an output signal from the MR element to be distorted.

In order to obtain a high-level output signal from a MR element, the air gap mentioned above must be reduced. However, if the air gap is reduced excessively, the MR element is magnetically saturated to cause its output waveform to be largely distorted, so that the output waveform becomes dissimilar to a sine waveform. Namely, in general, a magnetic sensor utilizing a MR element has the following characteristics. When the originally narrow air gap varies slightly the output amplitude does not vary but the output waveform is distorted due to the magnetic saturation. Conversely, when the air gap is originally wide the waveform of an output from the senor is not distorted but the output amplitude varies when the air gap varies.

Thus, when an attempt in obtaining a high-level output from a known angle detector utilizing the MR element is made, an output, the waveform of which is distorted, is obtained and an output of a sine waveform is not. When an attempt in obtaining an output signal of a sine waveform having no distortion is made, a high-level output signal cannot be obtained.

SUMMARY OF THE INVENTION

An object of the present invention is to provide an apparatus for magnetically detecting the position or speed of a moving body, which is capable of obtaining an output signal of a sine waveform containing no major higher harmonics and having no distortion even when the air gap between a magnetic medium and a magnetic sensor is reduced.

A feature of the present invention resides in the arrangement of MR elements constituting a magnetic sensor, which is capable of eliminating the major higher harmonics by which the waveform of an output signal is distorted. Namely, the feature of the present invention resides in an apparatus for magnetically detecting the relative position or speed of moving and stationary bodes, consisting of a magnetic medium provided in either a moving body or a stationary body, a plurality of magnetic poles arranged successively with a predetermined pitch on the magnetic medium, a plurality of MR elements which are provided on the other of the moving body and stationary body so as to be opposed to the magnetic medium, and which is adapted to sense a magnetic field generated by the magnetic poles and thereby cause the electric resistance thereof to vary, and an output circuit connected electrically to the MR elements and adapted to convert the variations in the electric resistance of each MR element into an electric signal which is outputted as a signal representative of the relative position or speed of the moving and stationary bodies, the MR elements forming a plurality of MR element pairs each of which consists of two MR elements, the distance between the two MR elements in each MR element pair and the distance between adjacent MR element pairs being determined so that the electric signals based on the variations of electric resistance of the MR elements are generated so as to offset the major higher harmonic with each other, which are contained in the electric signals, by synthesizing the same electric signals.

According to the present invention, even when the air gap between the magnetic medium and magnetic sensor varies to such a small range that causes magnetic saturation to occur in the magnetic sensor, the distortion of an output signal waveform due to the magnetic saturation can be eliminated. Since the distortion of an output signal waveform due to the magnetic saturation can be eliminated, it is possible to increase the amplitude of an output signal by reducing the air gap between the magnetic medium and magnetic sensor in advance. The present invention capable of obtaining an output signal of a large amplitude having no distortion in the waveform thereof enables an apparatus, which has high accuracy and resolution, for magnetically detecting the position or speed of a moving body to be provided.

BRIEF OF THE DRAWINGS

FIGS. 5a-5b illustrate the operations of and the waveforms of outputs from various parts of the magnetic sensor of FIGS. 2 and 3, for making the operation of the sensor as a whole understood;

FIG. 8 illustrates still another example of the connection of MR element constituting the magnetic sensor of FIG. 2;

Figure 2:
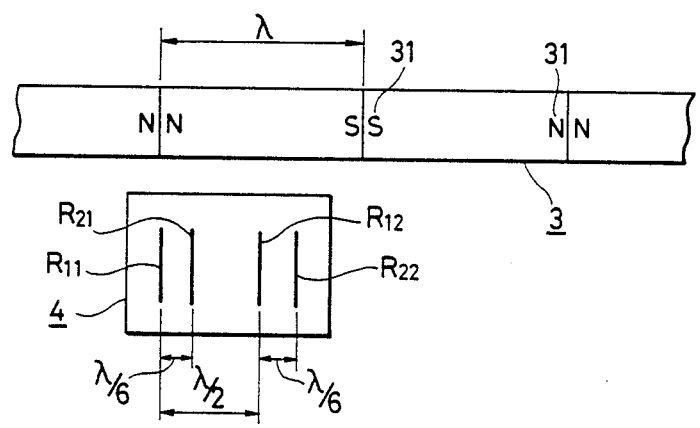
FIG. 2 is an expansion plan of an example of the arrangement of MR elements (two MR element pairs are used in this example) which constitute a magnetic sensor in the apparatus of FIG. 1.
Figure 10:
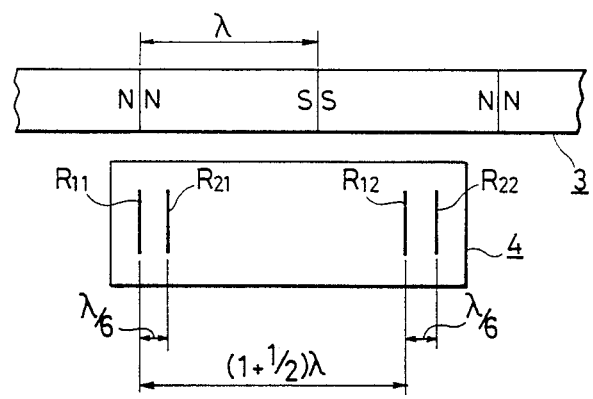
Figure 11:
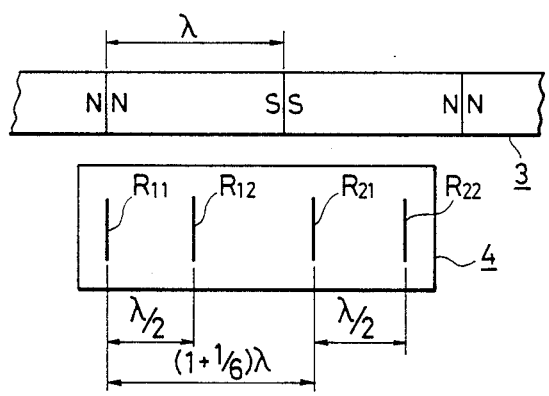
Figure 12:
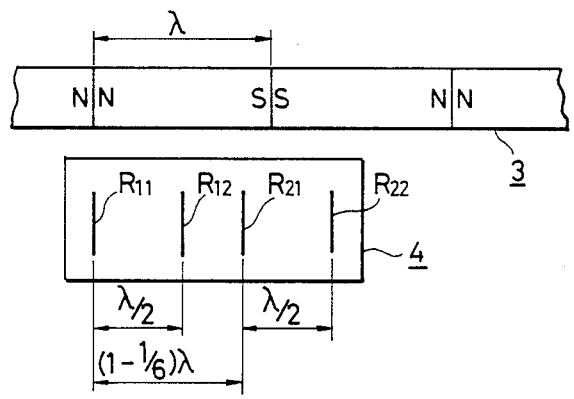
Figure 13:
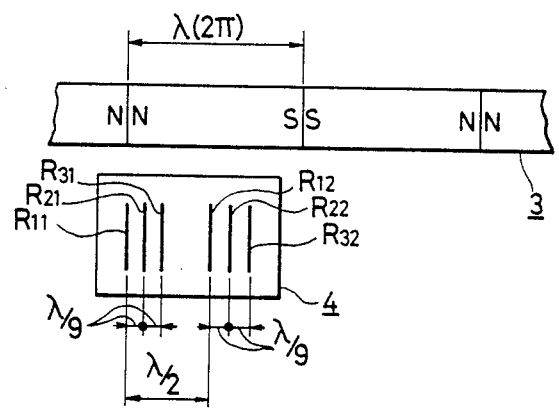
Figure 14:
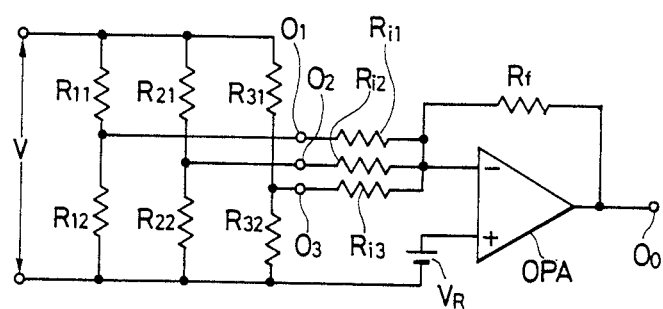

FIGS. 9a-9c illustrated the operations of and the waveforms of outputs from various parts of the magnetic sensor of FIG. 8, for making the operation of the sensor as a whole understood;

FIGS. 10 to 12 show some modified examples of the connection of MR elements constituting the magnetic sensor of FIG. 2;

FIG. 13 shows a further example of the arrangement of MR elements (three MR element pairs are used in this example) which constitute the magnetic sensor of FIG. 2;

FIG. 14 illustrates an example of the connection of MR elements constituting the magnetic sensor of FIG. 13; and FIGS. 15a-15j illustrate the operations of and the waveforms of outputs from various parts of the magnetic sensor of FIGS. 13 and 14, for making the operation of the sensor as a whole understood.

DESCRIPTION OF THE PREFERRED EMBODIMENTS

An embodiment of the present invention will now be described with reference to FIGS. 1 to 5.

Figure 1:
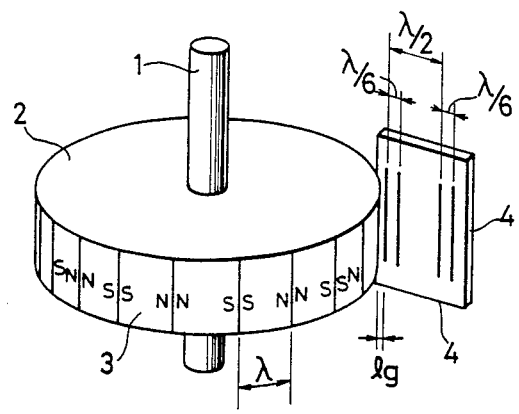
FIG. 1 is a schematic diagram of an embodiment of the apparatus for magnetically detecting the position or speed of a moving body according to the present invention.

FIG. 1 shows the construction of an embodiment of the detecting apparatus according to the present invention, in which a rotary drum 2 is mounted fixedly on a rotary shaft 1 which is rotated by a movement of a moving body with a magnetic medium 3, which has magnetic signals recorded with magnetic poles N and S of a pitch $\lambda$ provided at the outer circumferential portion of the rotary drum 2.

The magnetic medium 3 in this embodiment consists usually of magnetic powder solidified with a resin, and magnetic poles 31 fixed magnetically to the solidified body. This magnetic medium 3 may consist of a plurality of permanent magnets arranged in order. A magnetic sensor 4, in which MR elements are arranged at predetermined intervals, is fixed in opposition to the magnetic medium 3 with a clearance $l_g$ provided therebetween. Reference numeral 41 denotes a substrate, on which the MR elements are fixed, of the sensor.

The concrete relation between the magnetic medium 3 and magnetic sensor 4 in FIG. 1 is shown in expansion plan in FIG. 2. The magnetic poles 31 are recorded with a recording pitch $\lambda$ on the recording medium 3. The magnetic sensor 4 consists of two MR element pairs, a first pair of which is composed of elements $R_{11}$, $R_{12}$, and a second pair of which is composed of elements $R_{21}$, $R_{22}$. The elements $R_{11}$, $R_{21}$ are spaced at $\lambda/6$, the elements $R_{11}$, $R_{12}$ at $\lambda/2$, and the elements $R_{12}$, $R_{22}$ at $\lambda/6$. Accordingly, the distance between the elements $R_{21}$, $R_{22}$ is also $\lambda/2$.

Figure 3:
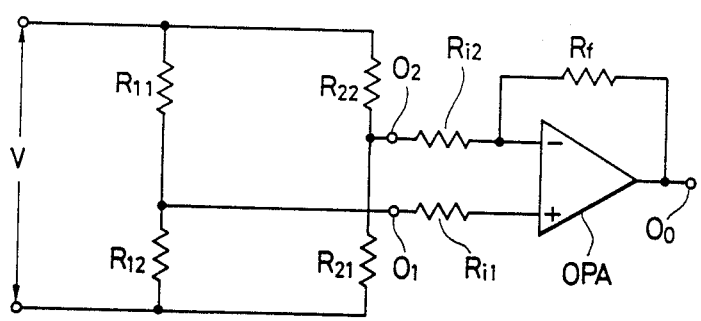
FIG. 3 illustrates an example of the connection of MR elements constituting the magnetic sensor FIG. 2.

These MR elements are bridge-connected as shown in FIG. 3. The MR elements $R_{11}$, $R_{12}$, and the MR elements $R_{22}$, $R_{21}$, which are series-connected, respectively, are connected in parallel with each other to a power source, to which MR element pairs a voltage V is applied. The output terminals $O_1$, $O_2$ of the bridges are connected to the positive and negative input terminals of a differential amplifier OPA through resistors $R_{i1}$, $R_{i2}$. A resistor $R_f$ is a feedback resistor. Accordingly, the outputs obtained from the output terminals $O_1$, $O_2$ of the bridges are amplified differentially by the differential amplifier OPA, and an output representative of a detected position appears at an output terminal $O_0$.

The electric resistance of each MR element on the magnetic sensor 4 varies with respect to the intensity of a magnetic field, the MR element being made by forming a film of a ferromagnetic material, such as NiFe and NiCo on the surface of glass by vapor deposition. The electric resistance of the MR element varies in proportion to the intensity of a magnetic field irrespective of the direction thereof as shown in FIG. 4 but this variation becomes saturated at a certain level.

Figure 4:
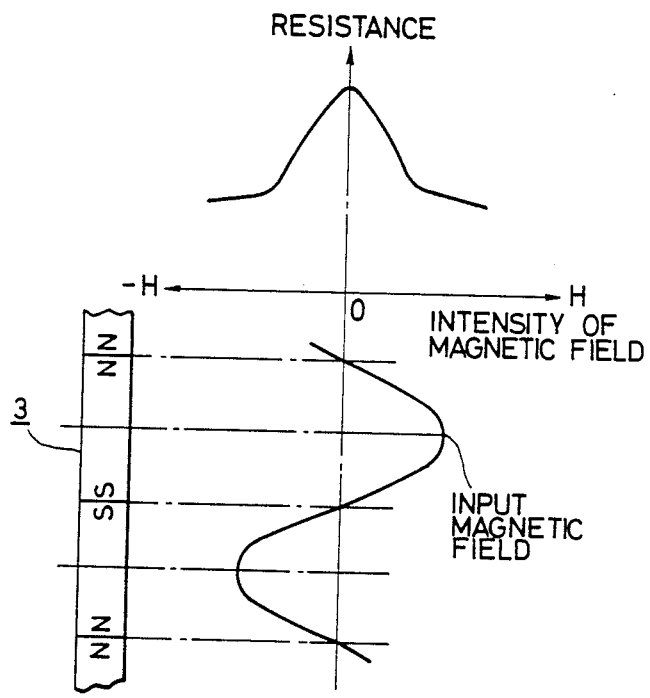
FIG. 4 is a graph illustrating the characteristics of a MR element.

When the rotary drum 2 is rotated to cause the magnetic medium 3 to be moved, a magnetic field, which varies along a sine curve as the input magnetic field of FIG. 4, is applied to the magnetic sensor 4 on the basis of the magnetic fields of the magnetic poles 31. As a result, the resistances of the MR elements $R_{11}$, $R_{21}$, $R_{12}$, $R_{22}$ vary as shown in FIGS. 5a to 5d. In this case, the air gap between the magnetic medium 3 and magnetic sensor 4 is comparatively small. In the portion in which the intensity of the magnetic field is small, the resistance of the MR element decreases in proportion to the intensity of the magnetic field. However, when a magnetic field of a high intensity is applied to the magnetic sensor, the resistances of the MR elements becomes saturated and the variation thereof decrease. As a result, the resistances of the MR elements $R_{11}$, $R_{21}$, $R_{12}$, $R_{22}$ vary as shown in FIGS. 5a to 5d. As apparent from the figures, the waveforms of the resistance variations of the MR elements have short flat portions corresponding to the minimum portions of the resistance. Accordingly, the output voltages v01, v02 from the output terminals $O_1$, $O_2$ of the bridge circuits have distorted signal waveforms as shown by solid lines in FIGS. 5e and 5f. In this embodiment, one pitch ($\lambda$) of the magnetic poles 31 corresponds to one cycle of these voltages v01, v02.

An analysis of this waveform shows that each of these waveforms can be decomposed into a fundamental wave v011, v021 shown by broken lines, and a third harmonic v012, v022 as a major harmonic component, the frequency of which is three times as large as that of the fundamental wave, shown by broken lines as well. The phase difference between the fundamental waves v011, v021 the phase difference between the third is $2\lambda/3$, while harmonics v012, v022 is zero. When these two waves are added differentially by the differential amplifier, the third harmonic components are offset to become zero, and the fundamental wave components alone are added to each other, so that a sine wave output v0 shown in FIG. 5g is obtained at the output terminal of the differential amplifier.

Figure 6:
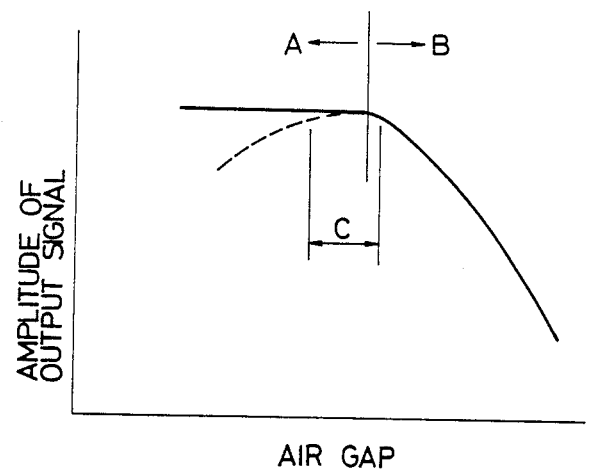
FIG. 6 is a graph showing the relation between an air gap in the apparatus and the amplitude of an output signal.

As is clear from the above statement, if the first and second MR element pairs $R_{11}$, $R_{12}$; $R_{21}$, $R_{22}$ are arranged with λ6 with the distances between the first and second elements $R_{11}$, $R_{21}$; $R_{12}$, $R_{22}$ in these MR element pairs kept at λ/2, the distortion of an output voltage, which occurs due to the saturation of the MR elements, from the magnetic sensor can be offset. The variation of fundamental wave components with respect to that of the air gap is as shown by a broken line in FIG. 6. Accordingly, if the MR elements are used within the range C, in which the output variation is very small, the output variation with respect to the air gap also becomes very small.

Figure 7:
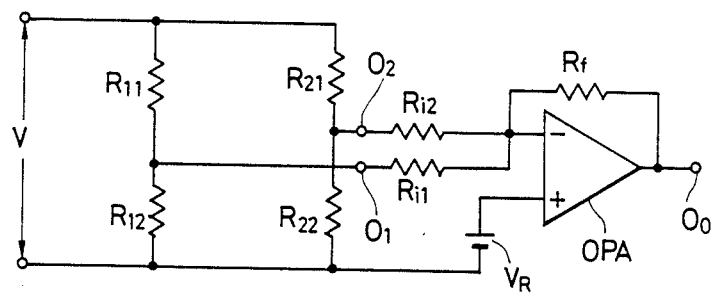
FIG. 7 illustrates another example of the connection of MR elements constituting the magnetic sensor of FIG. 2.

FIG. 7 shows an example of the connection of MR elements, in which the MR elements $R_{21}$, $R_{22}$ are connected in the contrary manner as compared with the corresponding MR elements shown in FIG. 3, whereby the phase of the voltage v02 at the output terminal $O_2$ becomes opposite to that of the voltage v01. In this example, the two outputs v01, v02 are added simply to each other by the differential amplifier OPA to thereby offset the third harmonic components. Reference letters $V_R$ denote an offset compensation voltage, which may be added by dividing a power source voltage V by resistances.

FIG. 8 shows an example of three-terminal connection of MR elements, in which the MR elements $R_{11}$, $R_{21}$; $R_{12}$, $R_{22}$, which are connected in series, respectively, are further connected in series to a power source V with an output terminal $O_0$ connected to an intermediate node as shown in the drawing. The resistance variations of the MR elements are as shown in FIGS. 5a to 5d. Accordingly, the resistance of the elements $R_{11}+R_{21}$ on the upper side of the three terminal connection varies as shown in FIG. 9a, and the resistance of $R_{12}+R_{22}$ on the lower side thereof as shown in FIG. 9b, so that an output voltage obtained from the output terminal $O_0$ is a sine wave output as shown by a reference letter v0 in FIG. 9c. An amplifier, which is not used in this example, may be used in a subsequent stage, whereby DC components can be removed.

FIGS. 10 to 12 show some examples of arrangement of MR elements, which examples are obtained by further modifying the arrangement of MR elements of FIG. 2. The methods shown in any of FIGS. 3, 7 and 8 of connecting MR elements to form an output circuit may be employed in these examples.

FIG. 10 shows an example, in which the distance between the elements $R_{11}$, $R_{12}$ in the first MR element pair and the distance between the elements $R_{21}$, $R_{22}$ in second MR element pair are set to $(1+1/2)\lambda$, the relation between the first elements $R_{11}$, $R_{21}$ and between the second elements $R_{12}$, $R_{22}$ in these MR element pairs being identical with that in the example of FIG. 2. The phase of variations of the resistances of the elements $R_{11}$, $R_{12}$; $R_{21}$, $R_{22}$ are shifted by 2 λ from those of the variations of the resistances of the corresponding elements in the example of FIG. 2.

However, since the magnetic signals continue with the recording pitch λ, the waveforms of the elements $R_{12}$, $R_{22}$ are identical with respect to those of the corresponding elements shown in FIG. 5, and these elements operate in the same way as the MR elements arranged as shown in FIG. 2. Generally speaking, even if the distance between the MR elements $R_{11}$, $R_{21}$; $R_{12}$, $R_{22}$ is set to $(m+\frac{1}{2})\lambda$, wherein m is an integer, the elements operate in the same manner.

FIG. 11 shows an example, in which the distances between the first element $R_{11}$, $R_{21}$ and between the second elements $R_{12}$, $R_{22}$ in the MR element pairs are set to $(1+1/6)\lambda$, the distances between the elements $R_{11}$, $R_{12}$ and between the elements $R_{21}$, $R_{22}$ being equal to those λ/2 between the corresponding elements of FIG. 2. The phase of variation of resistances of the elements $R_{11}$, $R_{21}$ and the phase of variation of resistances of the elements $R_{12}$, $R_{22}$ are shifted by 2 λ from those of variation of resistances of the corresponding elements of FIG. 2.

However, since the magnetic signals continue with the recording pitch λ, the waveforms of the elements $R_{21}$, $R_{22}$ with respect to those of the elements $R_{11}$, $R_{12}$ are identical with those of the corresponding elements shown in FIGS. 5a to 5d, and these elements operate in the same way as the MR elements arranged as shown in FIG. 2.

FIG. 12 shows an example, in which the distances between the first elements $R_{11}$, $R_{21}$ and between the second elements $R_{12}$, $R_{22}$ in the MR element pairs are set to $(1-1/6)\lambda$, the distances between the elements $R_{11}$, $R_{12}$ and between the elements $R_{21}$, $R_{22}$ being which is equal to the level shown in FIG. 2. The phase of variation of the resistances of the elements $R_{11}$, $R_{21}$ and that of variation of the resistances of the elements $R_{12}$, $R_{22}$ in this example is $5\pi/3$, while those of variation of the resistances of the corresponding elements of the example of FIG. 2 is $\pi/3$.

However, since the magnetic signals continue with the recording pitch λ, the phase differences between the elements $R_{11}$, $R_{21}$; $R_{12}$, $R_{22}$ are $2\pi/3$. This means that, with reference to the element $R_{12}$, the phase of the element $R_{11}$ is shifted by $\pi/3$, and the relation between the elements $R_{22}$, $R_{21}$ is also considered identical. Therefore, the difference between the phases of the voltages v01, v02 at the output terminals $O_1$, $O_2$ in FIG. 3 becomes identical with that between the phases of the voltages v01, v02 in mutually substituted state, the waveforms of which are shown in FIG. 5, so that the level of an output v0 are representative of a detected position becomes equal to that of an output from the example of FIG. 2.

Generally speaking, even if the distances between the MR elements $R_{11}$, $R_{21}$ and between the MR elements $R_{12}$, $R_{22}$ in the examples of FIGS. 11 and 12 are set to $(n\pm1/6)\lambda$, wherein n is an integer, the MR elements operate in the same manner.

The above examples can be summarized as follows. The MR element pairs $R_{11}$, $R_{21}$; $R_{12}$, $R_{22}$ each of which pairs consists of two MR elements are provided in opposition to a magnetic medium 3 having magnetic poles provided successively with a predetermined pitch λ. the two elements in each MR element pairs are arranged with a distance therebetween set to $(m+\frac{1}{2})\lambda$, wherein m is an integer, and the two MR element pairs have a distance therebetween of $(n\pm1/6)\lambda$, wherein n is an integer. These MR elements are connected in the following manner to form an output circuit. Namely, when a power source voltage is applied to this output circuit, two pairs of voltages are generated so that the third harmonic components therein have the same or opposite phases, on the basis of the resistance variation in each MR element, which occurs in accordance with the movement of the magnetic medium 3, and these two pairs of voltages are synthesized so as to offset the third harmonic components with each other. Consequently, a sine output containing no third harmonic wave components is obtained from the output circuit formed in this manner.

In the above mentioned embodiments, there was used a method, in which two MR element pairs are spaced at a distance that third harmonic components included in the output voltages thereof are of the opposite phase to each other and the output voltages are synthesized to offset the third harmonic components. The following is an example of a method of arranging three MR elements so that the phases of the third harmonic components are shifted by $2\pi/3$ from one another, and synthesizing the output therefrom to set the third harmonic components to zero.

FIG. 13 is an expansion plan of an example of a structure having magnetic medium 3 and a magnetic sensor 4, for practicing this method. In this example, six magnetic resistance elements $R_{11}$, $R_{12}$, $R_{21}$, $R_{22}$, $R_{31}$, $R_{32}$ are arranged at such intervals that are shown in the drawing in opposition to the magnetic signals spaced with the recording pitch $\lambda$. Namely, the element $R_{21}$ is set ? / in a position $\lambda/9$ away from the element $R_{11}$. The elements $R_{21}$, $R_{31}$; $R_{12}$, $R_{22}$; $R_{22}$, $R_{32}$ are also set in positions $\lambda/9$ away from each other. The elements $R_{11}$, $R_{12}$; $R_{21}$, $R_{22}$; $R_{31}$, $R_{32}$ are away from each other by $\lambda/2$.

The MR elements thus arranged are connected as shown - in FIG. 14. Namely, the elements $R_{11}$, $R_{12}$; $R_{21}$, $R_{22}$; $R_{31}$, $R_{32}$ are connected in series. They are further connected to a power source V, and outputs are obtained from the respective nodes $O_1$, $O_2$, $O_3$. These three outputs are synthesized and amplified in an amplifier OPA, and an output representative of a detected position is obtained from an output terminal 00. Reference symbols $R_{i1}$, $R_{i2}$, $R_{i3}$ denote input resistors for the amplifier, $R_f$ a feedback resistor, and $V_R$ a voltage for removing a DC bias voltage of an input.

When a rotary drum 2 is rotated to turn the magnetic medium 3, the resistances of the MR elements vary. The variations of the resistances of these MR elements are as shown in FIGS. 15a to 15f. Accordingly, the voltages v01 to v03 obtained from the output terminals $O_1$ to $O_3$ vary as shown by solid lines v01 to v03 in FIGS. 15g to 15i. If these output voltage signals v01 to v03 are decomposed into fundamental waves and higher harmonics, the waves shown by broken lines in the drawings are obtained, which are fundamental waves v011, v021, v031 and third harmonic waves v012, v022, v032. The difference between the phases of the fundamental waves is $2\pi/9$. The difference between the phases of the third harmonic waves v012 to v032 is $2\pi/3$ in terms of electric angle thereof. Accordingly, when the ? to v03 obtained from the output terminals $O_1$ voltages v01 to $O_2$ are added, the third harmonic components becomes zero, and the remainder consists of synthesized fundamental components, a sine wave v0 which is shown in FIG. 15j being obtained from the output terminal $O_0$ of the amplifier OPA.

In this example, three pairs of MR elements are used. It is possible to remove third harmonic waves in the same manner by using k pairs of MR elements which are spaced from each other by $\lambda/3$. Generally speaking, if k pairs of MR elements are arranged in positions spaced by $(n\pm 1/3k)\lambda$, wherein n is an integer, these elements operate in the same manner as previously mentioned.

All of the above examples can be summarized as follows. k pairs (k is an integer larger than one) of MR elements, each of which pairs consists of two MR elements, are provided in opposition to a magnetic medium having magnetic poles arranged continuously with the predetermined recording pitch $\lambda$. The two MR elements in each pair are arranged in positions spaced at $(m+\frac{1}{2})\lambda$, wherein m is an integer, and these MR element pairs are spaced from each other at $(n\pm 1/3k)\lambda$, wherein n is an integer. These MR elements are connected in the following manner to form an output circuit. When a power source voltage is applied to this output circuit, the k pairs of voltages are generated so that the third harmonic components therein have a $2\pi/k$ phase, on the basis of the resistance variation in each MR element, which occurs in accordance with the movement, of the magnetic medium, and these k pairs of voltages are synthesized so as to offset the third harmonic components with one another.

According to the present invention described above, the distortion of an output waveform due to the saturation of the magnetic resistance elements can be eliminated, so that an output representative of a detected position can be obtained as a signal of a sine waveform. This enables the air gap to be minimized, and the level of an output to thereby increase. Moreover, since the amplitude variation of an output of a fundamental wave can be minimized, a highly accurate position detecting apparatus can be obtained.

We claim:

1. An apparatus for magnetically detecting the relative position or speed between moving and stationary bodies, comprising:
   a magnetic medium provided on either one of the moving and stationary bodies, and having a plurality of magnetic poles arranged continuously thereon at a constant pitch $\lambda$;
   sensing means including plural MR elements, provided on the other of the moving and stationary bodies in opposition to said magnetic medium, for sensing a magnetic field generated by said magnetic poles to thereby cause variation in the electric resistance thereof, in which said MR elements constitute k sets of element pairs, each set consisting of two MR elements arranged at positions spaced at $(m+\frac{1}{2})\lambda$ from one another, where m is an integer, and said element pairs being spaced by $(n+1/3)\lambda$ from each other, wherein n is an integer; and
   output circuit means, including said MR elements connected in a bridge circuit so that said two MR elements of each element pair are connected in series and said k sets of series connections of said MR elements are connected in parallel with each other with respect to a power source of the bridge circuit, for synthesizing k sets of voltages appearing at nodes of said two MR elements connected in series and which include third harmonic components having a phase difference of $2\pi/k$ from each other so as to produce an output signal.

2. An apparatus for magnetically detecting the relative position or speed between moving and stationary bodies according to claim 1, wherein said magnetic medium and said MR elements are opposed so closely that saturation in variation of the electric resistance of said MR elements causes distortion in the waveforms of voltages appearing across said MR elements, and said output circuit means enables an increase in the amplitude of the output signal.

3. An apparatus for magnetically detecting the relative position or speed between moving and stationary bodies according to claim 1, wherein said output circuit means provides a sinusoidal output signal.

4. An apparatus for magnetically detecting the position or speed of a moving body according to claim 1, wherein said MR elements constitute two MR element pairs, two MR elements in each pair being arranged in positions spaced at $\lambda/2$, said MR element pairs being spaced from each other at $\lambda/6$.

5. An apparatus for magnetically detecting the position or speed of a moving body according to claim 1, wherein said MR elements constitute two MR element pairs, two MR elements in each pair being arranged in positions spaced at $5\lambda/2$, said MR element pairs being spaced from each other at $\lambda/6$.

6. An apparatus for magnetically detecting the position or speed of a moving body according to claim 1, wherein said MR elements constitute two MR element pairs, two MR elements in each pair being arranged in positions spaced at $\lambda/2$, said MR element pairs being spaced from each other at $7\lambda/6$.

7. An apparatus for magnetically detecting the position or speed of a moving body according to claim 1, wherein said MR elements constitute two MR elements pairs, two MR elements in each pair being arranged in positions spaced at $\lambda/2$, said MR element pairs being spaced from each other at $5\lambda/6$.

8. An apparatus for magnetically detecting the position or speed of a moving body according to claim 1, wherein said MR elements constitute three MR element pairs, two MR elements in each pair being arranged in positions spaced from each other at $\lambda/2$, said MR element pairs being from each other at $\lambda/9$.

9. An apparatus for magnetically detecting the position or speed of a moving body according to claim 1, wherein said MR elements constitute two MR element pairs.

10. An apparatus for magnetically detecting the position or speed of a moving body according to claim 9, wherein a voltage obtained from a node of each of said two pairs of series-connected MR elements is inputted into a differential amplifier, and an output is derived from said differential amplifier as a signal representative of the position or speed of said moving body.

11. An apparatus for magnetically detecting the position or speed of a moving body according to claim 10, wherein said MR elements in said two pairs of series-connected MR elements are connected so that the phases of the third harmonic components contained in the voltages obtained from the nodes thereof becomes opposite to each other, and said voltages are added to each other.

12. An apparatus for magnetically detecting the position or speed of a moving body according to claim 11, wherein said added voltages are inputted into one terminal of said amplifier with an offsetting voltage applied to the other terminal thereof.

13. An apparatus for magnetically detecting the position or speed of a moving body according to claim 1, wherein said MR elements constitute two MR element pairs, said output circuit means has a first connection formed by electrically connecting first elements in first and second MR element pairs together so that the third harmonic components contained in the voltages appearing in the respective elements offset each other and a second connection formed by electrically connecting second elements in said first and second MR element pairs together so that the third harmonic components contained in the voltage appearing in the respective elements offset each other, and said two connections are series-connected together and further to said power source to obtain said signal representative of the position or speed of said moving body from a node of said two series-connected connections.

* * * * *